United States Patent

Alric et al.

[15] 3,703,675
[45] Nov. 21, 1972

[54] FLOATING BATTERY CHARGING NETWORK

[72] Inventors: Andre A. L. Alric; Gilbert R. A. Porte; Joseph M. H. Glotin; Francis J. Higounenq, all of Hte Garonne; Serge P. Boussin, Cordeille-Cornebarieu, all of France

[73] Assignee: Societe Nationale Industrielle Aerospatiale, Paris, France

[22] Filed: Feb. 17, 1971

[21] Appl. No.: 116,175

[30] Foreign Application Priority Data

Feb. 25, 1970 France.....................7006723

[52] U.S. Cl...........................320/31, 320/39, 307/48
[51] Int. Cl..............................................H02j 7/34
[58] Field of Search..................320/22–24, 31–33, 320/37, 38, 39, 40, 5, 8–11; 307/48, 66; 318/443; 244/77 R

[56] References Cited

UNITED STATES PATENTS

| | | |
|---|---|---|
| 3,500,167 | 3/1970 | Applegate et al........320/37 X |
| 2,821,677 | 1/1958 | Knight.....................307/48 X |
| 3,178,629 | 4/1965 | Saslow........................320/23 |
| 3,426,263 | 2/1969 | Henningan et al...........320/23 |
| 3,222,535 | 12/1965 | Engelhardt..............307/48 X |
| 3,424,916 | 1/1969 | Fenley....................320/43 X |
| 3,356,922 | 12/1967 | Johnston.......................320/6 |
| 3,599,073 | 8/1971 | Wilson et al.................307/66 |

Primary Examiner—J. D. Miller
Assistant Examiner—Robert J. Hickey
Attorney—Karl W. Flocks

[57] ABSTRACT

Method and apparatus for charging storage batteries and discharging same into a network through a contactor controlled by comparing network voltage with a reference voltage and battery off-load voltage with a reference voltage and a clock to cut off charging after a predetermined time to limit battery charge to 95% of its rated capacity.

27 Claims, 6 Drawing Figures

PATENTED NOV 21 1972 3,703,675

INVENTORS
ANDRE A. L. ALRIC
GILBERT R. A. PORTE
JOSEPH M. H. GLOTIN
FRANCIS J. HIGOUNENQ
SERGE P. BOUSSIN

BY KARL W FLOCKS

ATTORNEY

FLOATING BATTERY CHARGING NETWORK

This invention relates to a method of and system for charging storage batteries and discharging the same into a load circuit and is of use more particularly, but not exclusively, with cadmium-nickel alkaline accumulators.

Storage batteries are of course usually floated across a distribution network energized either by a d.c. dynamo or by an alternator and rectifier. If a battery is to have optimum weight, ampere-hour capacity and instantaneous discharge features, the result, inter alia in the case of cadmium-nickel alkaline batteries, is a product which is very sensitive to charging conditions and to the overloading which such batteries usually have to withstand. One way of optimizing the electrical properties of a storage battery is to use thin plates having a very large surface area and placed very close together, needing the use of very thin separators which touch the plates they separate, so that a reduced quantity of electrolyte is trapped between the plates and is virtually in the actual separators if the same are spongy. Since it is difficult for liquid to penetrate between the plates, topping up the electrolyte may be very difficult. Battery electrolyte reserve is therefore very reduced, in particular in the case of cadmium-nickel alkaline batteries; also, the quantity of electrolyte in such batteries depends upon the state of battery charge.

There is some loss of electrolyte by evaporation and by electrolytic dissociation at the end of charging and on overload, and the loss is aggravated by the battery heating up as a result of Joule effect, of the chemical reaction, which is exothermic on charge or discharge according to the type of battery, and of ambient temperature conditions.

These phenomena, which have nothing to do with the electrical means used to charge the battery and which are bound to occur when the battery is permanently connected to a charger or to a charge-discharge circuit (floating battery), are aggravated when the battery is charged from sources delivering a ripple current, for as the battery nears the end of charging and its voltage rises, the battery voltage may be greater than each minimum of the charging voltage, so that there is an intermittent discharge of the battery into the network and the battery cannot be fully charged.

Constant-current and constant-voltage battery charging is known. A suggestion with constant-current charging has been for the optimum charging current conditions determined by the battery maker to be imitated in the form of consecutive charging steps or stages. The end of each stage, for instance, stage three, can be determined by the battery voltage with a correction for battery temperature. The final stage is maintained for the whole time that the network is energized, with the result, of course, that the charged battery is permanently overcharged. This procedure is a useless complication of the charging operation, for current level is of virtually no importance at the beginning of charging, but this king of charging, with its systematic dissociation of electrolyte at the end of charging, is particularly harmful to battery life.

There are similar disadvantages with constant-voltage charging which, although possibly better as regards overcharing, becomes very slow and makes it difficult to reach an adequate level of charge.

Another suggestion is constant-voltage battery charging by brief current pulses which are output seriatim with reference to the off-load battery voltage and which are stopped by the rise in battery voltage during charging. In other words, chargers of this kind, which have already been used for aircraft, keep the battery within a range or spread of voltages. However, since the battery voltage stabilizes after charging at a value below the end-of-charge voltage, a further charge is systematically added to the battery after each charging period even if no discharge period follows the charging period. This kind of charging can provide full (100%) charging but causes systematic overcharging and therefore electrolyte loss.

Another suggestion aimed at achieving full charging is to couple electrochemically similar but low-capacity cells in parallel with the battery being charged and to control the charge by measuring the difference between the voltages of the two kinds of cell. Another suggestion is to use as an end-of-charge yardstick the quantity of electrolyte or the pressure of the dissociated electrolyte gases. The obvious disadvantage of such suggestions is to use the actual dissociation of electrolyte as a reference to that electrolyte dissociation cannot be inhibited.

All the known charging procedures, whether on a constant-current or constant-voltage basis, need special charging facilities with special control, whereas the charger for a storage battery on board vehicles in general and aircraft in particular is actually a generator which is connected to the load circuit and supplies all the normal requirements thereof and keeps a floating battery charged. The battery is charged to provide starts for the vehicle and supply current in abnormal and usually brief circumstances. Consequently, the battery voltage may fluctuate considerably with network loading and any control of charging, however programmed, becomes difficult; also, a floating battery is bound to be over-charged over long periods of time.

The starting point of this invention is to greatly reduce electrolyte dissociation yet provide rapid battery recharging and keep the battery in a satisfactory state of charge to enable normal use of the battery and to give very long intervals between topping-up operations.

The invention is based on the following observation which is confirmed by a statistical study of batteries. There is a correlation between, on the one hand, the state of charge of a battery and the risks of electrolyte dissociation and, on the other hand, the current and charging time. In other words, the two main parameters in the method and system according to the invention and providing the basis for controlling charging are the level of the charging current and the charging time; clearly, the risk of electrolyte dissociation increases in proportion as the charging current is heavier and the charging time is longer.

The invention provides a method of using a storage battery in a d.c. network comprising a charging-current source which normally covers the network current requirements and which can also charge the battery, wherein the battery is cut into the network by a contactor whose closure is dependent at least upon a predetermined network voltage drop and upon a drop of the battery off-load voltage and, in the event of the latter kind of closure, upon a clock which interrupts the charging current after a predetermined period of time so as to limit the charging energy to ensure that the battery charge never exceeds 95 percent of its rated capacity.

Advantageously, to allow for the state of charge of the battery and the state of the battery electrolyte, the initial charging period is very short, for instance, a few minutes; the charging current is measured at least at the end of this first charging time or period and, depending upon the charging current, the first charging period is prolonged, if the current is fairly low, until the charging current has dropped to a predetermined lower level, or if the charging current is relatively heavy, a further predetermined charging time is given, the choice possibly being repeated at the end of the fresh charging period in dependence upon the then measured charging current. If the charging current is low after a first charging time, in which some energy has been supplied to the battery, either the battery has already reached an adequate state of charge or the state of the battery electrolyte, for instance, its quantity or temperature, limits the quantity of electricity which the battery might still be able to absorb. If, however, the current is high at the end of the first charging period, the battery is very run down and the electrolyte is highly conductive, so that the battery can absorb further energy without being overcharged.

A common current reference level can be chosen at the end of each charging time to decide the form of charging time extension, the charge stop levels — which are by hypothesis below the threshold — being higher in proportion as charging is more prolonged, so as to preclude any risk of overcharing, for the battery heats up more and its resistance decreases in proportion as charging lasts longer.

Preferably, for safety reasons the charging procedure is initiated whenever the contactor has closed either as a result of a network voltage drop or for any other reason — i.e., whenever the network has or may have consumed battery energy. Also for safety reasons, the charging process is systematically stopped when it has been going on long enough, for instance 1 hour. Also for safety reasons, if the charging current continues to rise during a charging sequence even for a fairly short time, e.g. 2 minutes, a warning is triggered. Also, the contactor can be systematically closed whenever any vehicle safety facility is connected to the network, for instance, when the automatic pilot of an aircraft is connected into circuit for landing.

In a circuit arrangement using the method according to the invention, a contactor-closing signal is taken from the output of at least one OR-gate receiving a first signal from a first comparator circuit for comparing the network voltage with a reference voltage, the OR-gate receiving a second signal from a second comparator circuit comparing the battery off-load voltage with a reference voltage, the contactor-opening signal being subordinated to an electronic clock started by a detector of current flow from the network to the battery — i.e., at the start of battery charging.

Preferably, after a predetermined time (first charging period or time) the electronic clock starts a comparator circuit for comparing the charging current with a reference current threshold, the comparator circuit comprising two branches, one of which is operative if the charging current is below the threshold and initiates, upon the current dropping below a predetermined threshold, a signal opening the contactor, the other branch being operative if the load current is above the reference current and maintaining the charging current for a second charging period determined by the electronic clock.

The second branch of the circuit arrangement can in turn be similarly subdivided into two branches and so on, so that a further charge can be given the battery if the charging current remains high despite an input of charging energy. However, the various branches are always so devised as to output a contactor-opening signal when the current drops to an appropriate lower level.

A reference value based on current level is usually a difficult parameter on which to base automatic control, more particularly in the case of an installation comprising a storage battery system where such current may be 1,000 amperes; the energy involved is such that it is impossible to convert the current into voltage by means of a resistance. According to a feature of the invention, current data are sampled at the output of a Hall-effect detector energized by a constant current and by the field of a winding connected to one terminal of the battery. A hall-effect detector is embodied by a thin rectangular semiconductor wafer, and the field of the winding flowed through by the current to be measured acts perpendicularly to the wafer; the same has on two opposite sides two electrodes for the supply of a constant current, and on the other two sides of the wafer are output electrodes providing a voltage proportional to the current.

Preferably, and also because of the high currents involved, the contactor is electromagnetic and not electronic (thyrotron, thyristor). The contactor coil energizing circuit therefore comprises, to control the contactor, the normally closed contact of a relay receiving the opening signal in series with the normally open contact of a second relay receiving the contactor-closing signal. Should there be an urgent requirement to close the contactor, the normally open contact of a third relay receiving the urgent closure signal is connected in parallel with the first two serially arranged contacts.

Advantageously, the various signals are supplied by threshold logic elements, hereinafter called bistables, using comparators. The signals supplied by the various bistables are combined by other logic systems; advantageously, the same have at their output a store for storing the transmitted signal until an erase signal appears.

The store circuit arrangements are preferably an OR-gate and an AND-gate, the OR-gate receiving as well as the initial signal the AND-gate output signal, the AND-gate receiving at its input the OR-gate output signal and the inversion of a signal for cancelling the OR-gate output signal.

The accompanying drawings show how the invention can be carried into effect. In the drawings.

Figure 1:
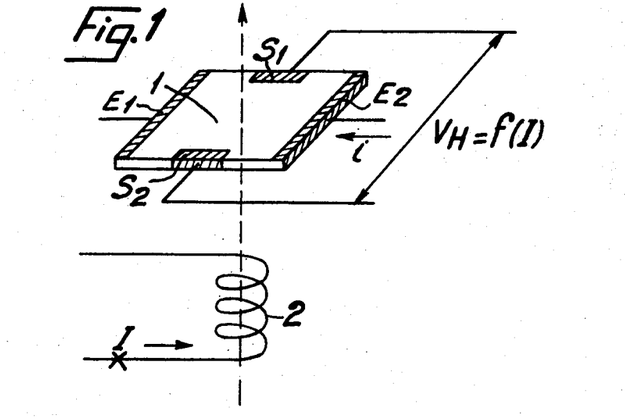
FIG. 1 is a schematic view of a Hall-effect detector.

The detector shown in FIG. 1 mainly comprises a thin rectangular semiconductor wafer 1 having four electrodes on its sides — two electrodes $E^1$, $E_2$ and two measuring electrodes $S_1$, $S_2$. When such a wafer is energized by a current $i$ and placed in a magnetic field which is perpendicular to the wafer major surface and produced by a winding 2 flowed through by a current I, a voltage known as the Hall voltage, $V_H$, is produced between the output electrodes $S_1$ and $S_2$ and is proportional to the vectorial product of the actuating current and the magnetic field — i.e.:

$$V_H = K.i.\vec{B}.$$

in which K is a coefficient for the detector.

In this invention, if I denotes the current flowing into the battery and if the current $i$ is constant, the voltage between the output electrodes $S_1$ and $S_2$ is proportional to the level of current flow through the battery.

Hereinafter and to give a general idea reference will be made more particularly hereinafter to 20-cell sintered-plate cadmium-nickel alkaline storage batteries with a rated voltage of 27 volts and a capacity of 25 ampere/hours (Ah) per cell. In the present case the d.c. network has a rated voltage of 29 volts. Of course, all the foregoing numerical values and those to be given hereinafter are purely explanatory and may vary with the battery and its working conditions.

To limit the charge of such a battery, depending on its state, to somewhere between 75 and 90 percent of its rated capacity so as to obviate the disadvantages of overcharging such as excessive electrolyte consumption and overheating, it is proposed to meet the following conditions based on statistical studies made with reference to technical characteristics, inter alia the charging curves of such batteries:

a. The battery off-load voltage is checked when charging is interrupted, and charging resumes when the latter voltage falls short of the rated voltage by a desired amount, for instance, 2 volts;

b. The network voltage is checked when the battery is disconnected from the network, and the battery is reconnected thereto upon the occurrence of a heavy current drain causing a voltage drop of e.g. 2 volts for more than a few hundreds of milliseconds;

c. If the charging current is less than 20 amperes after 5 minutes charging, charging continues until the current drops to 5 amperes, whereupon charging stops;

d. If the current is more than 20 amperes after 5 minutes charging, charging continues and two cases may arise:

Case 1 — the charging current becomes 20 amperes before a total charging time of 15 minutes has passed — charging is interrupted.

Case 2 — the charging current is still above 20 amperes after a total charging time of 15 minutes — charging continues until the charging current drops to 10 amperes;

e. The battery is also reconnected to the distribution network as a safety feature when the automatic pilot is cut-in, inter alia for automatic landings;

f. After use of the battery by the network, the charging procedure restarts automatically;

g. In all cases, even if in case (c) the charging current does not drop below 5 amperes and in case 2 of case (d) if the charging current does not drop below 10 amperes, the battery is obligatorily disconnected from the network, if necessary, after 1 hour's charging unless energy is then drawn from the battery, and h. A warning is triggered if the charging current continues to rise for more than 2 minutes during any charging sequence.

In case (c) a charging current of 5 amperes corresponds to a state of charge denoting that the battery is charged to form 85 to 90 percent of its rated capacity in normal temperature conditions; if charging is interrupted at a higher current (condition (d)), the state of charge is similar but the higher current at which charging is interrupted is due to the initial state and temperature of the battery.

Figure 4:
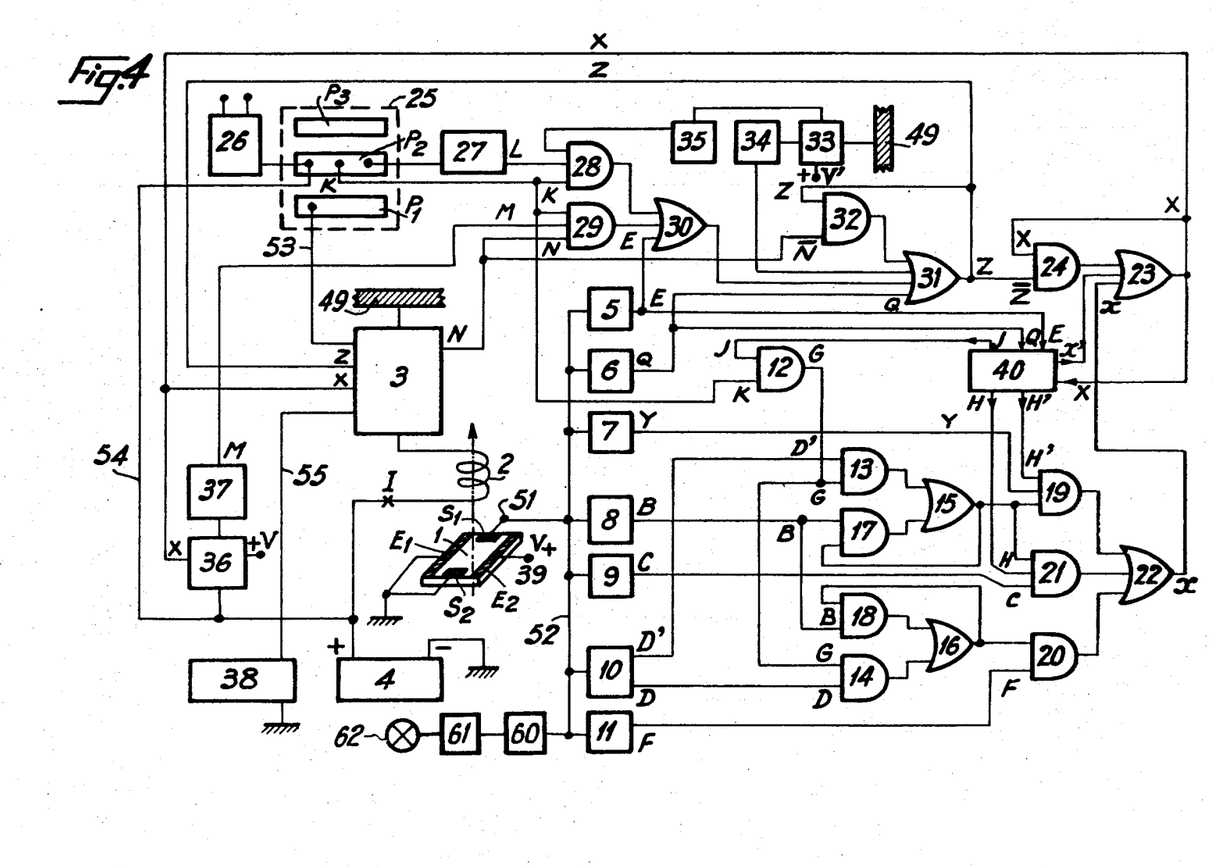
FIG. 4 is a block schematic diagram of the load circuit arrangement of a battery.
Figure 5:
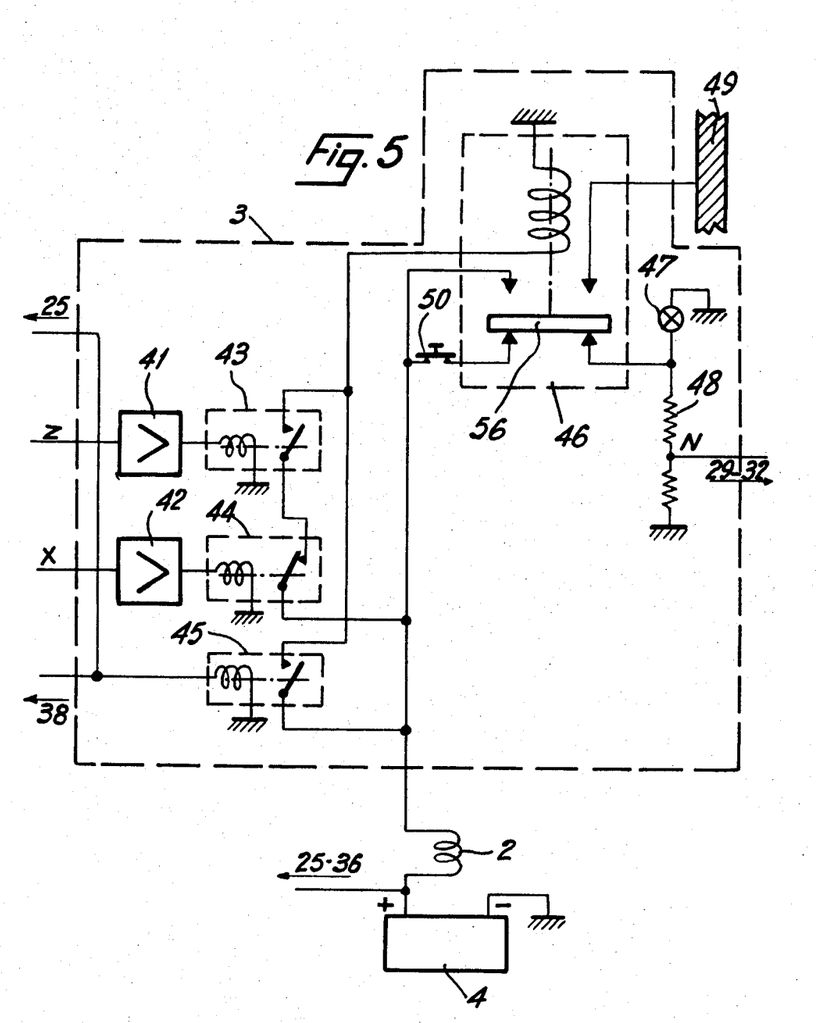
FIG. 5 is a block schematic diagram of the contactor adapted to connect the battery to the d.c. distribution network.

The circuit arrangement shown diagrammatically in FIGS. 4 and 5 embodies all the conditions just stated for the use of any storage battery, more particularly, with the numerical values given, a battery rated at 27 volts and used on a 29-volt system. It will be assumed hereinafter that in the battery-to-network connection symbolized by bushbars 49 — i.e., via the winding 2 — the current is positive (I > 0) when energy is being supplied to the battery, and negative (I < 0) when the battery is delivering to the network.

The circuit arrangement of FIG. 4 comprises:

1. A first unit or assembly or the like comprising means for measuring charging and discharging currents, battery off-load voltage, charging time and network current demands, and means for preparing signals associated with the measurements, such signals forming a data input to the second assembly or unit or the like, viz. the logic unit. The first unit also comprises the manual controls of the system.

2. A unit or assembly or the like comprising electronic logic components which collate the data from the first unit and convert such data into opening and closing signals for the contactor controlling battery connection to the network.

3. An electronic and electromechanical contactor unit or assembly or the like, shown in detail in FIG. 5, for opening and closing the battery-to-network connection circuit.

As will also be apparent hereinafter, the first unit is to some extent integrated with the second unit. The first unit comprises the various elements now to be described.

As described with reference to FIG. 1, the charging and discharging current is measured by a Hall detector 1 which is supplied with current between a terminal 39 (voltage V+) and earth and which experiences the magnetic field of the winding 2. The detector 1 outputs between earth and terminal 51 a signal proportional to the current I flowing through winding 2. The latter signal goes via a group 52 of parallel connections to a number of bistables 5–11 — i.e., threshold comparison devices — and to a differentiator unit 60. The bistables 5–11 are adapted to output a signal only for particular values of the current I flowing through the winding 2, and so in known manner each bistable actuates one or more differential comparators in a linear integrated circuit. If a number of comparators are used they are connected in parallel and their outputs are connected to the input of an AND-gate. If information on the direction of variation of the current I is needed, a circuit comprising a differentiator unit followed by another comparator is connected in parallel to the others, the AND-gate then having an extra input.

As an example, bistable 5 (see FIG. 6) is adapted to operate when current is rising and also between two definite values. Accordingly, the signal from connection 52 goes via connections 52a and 52b to the top (positive) and bottom (negative) inputs of differential comparators 65, 66 whose other inputs 65a 66a receive voltages representing the lower and upper current limit values respectively. The signal goes through connection 52c to a differentiator unit 67 (a resistance-capacitance circuit) whose output is connected to the positive input of a differential comparator 68, the negative input thereof being earthed. Since the outputs of the three comparators 65, 66, 68 are connected to the three inputs of an AND-gate 69, the latter outputs a signal only when the current level measured by the Hall detector is rising and between the two limits specified.

Figure 6:
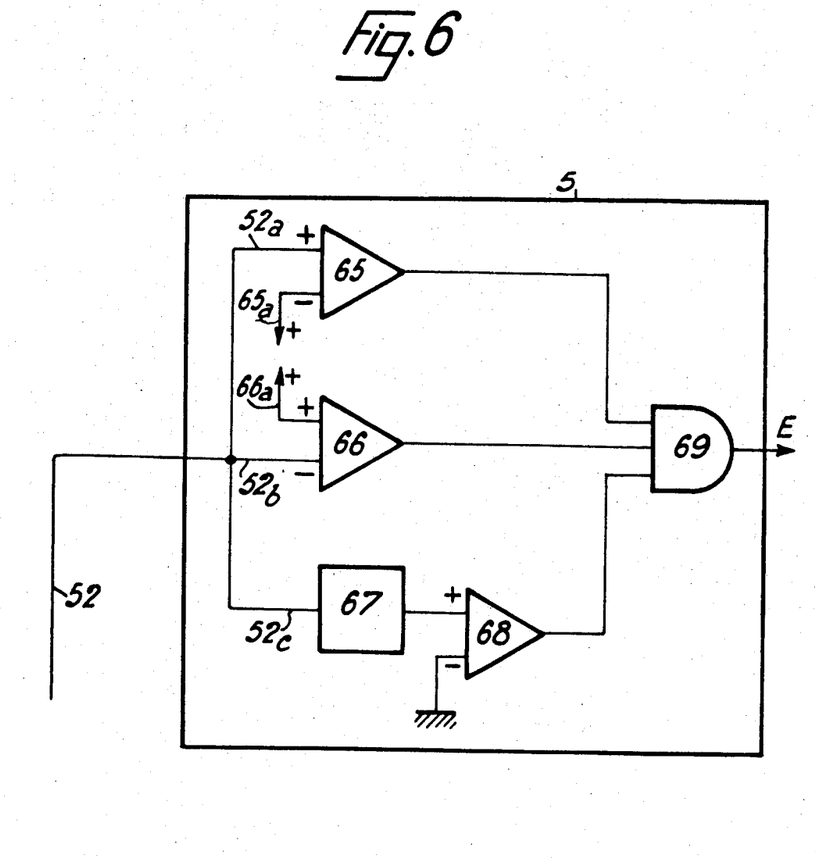
FIG. 6 is a schematic view of one of the bistable circuit arrangements.

As will be seen hereinafter, the bistables 6, 8 require only a single comparator having one input earthed and having its output directly delivering a signal Q for bistable 6 and a signal B for bistable 8. The bistables 7, 9, 11 each comprise two comparators and an AND-gate. The thresholds correspond one to the current corresponding to the outputting of a signal plus 10 percent and the other to the current corresponding to the outputting of a signal less 10 percent. The bistable 10 comprises two parallel arrangements having two outputs. The first arrangement comprises a single comparator (I> 20 amperes) and the second comprises two comparators and one AND-gate (I between 0 and 20 amperes). Other systems could of course be used instead of the ones described; more particularly, the bistables 6, 8 could be ordinary Schmitt triggers.

Consequently, and with 10 percent tolerances to give a general idea:

Bistable 5 outputs a signal E when the value of I moves in the sense of an increase into the 1–3 ampere range. As will be apparent hereinafter, from the time $T_0$ at which the contactor closes to initiate battery charging, the signal E determines the charging sequence starting time $T'_0$. This change of the current I between 1 and 3 amperes corresponds to the setting-up of the charging current. This current value is preferred to be near zero to ensure that a fresh charging sequence definitely begins, for instance, after a period of time in which the battery has supplied current to the network and the current I, since it reversed, has been negative.

Bistable 6 outputs a signal Q when I is negative — i.e., when the battery is discharging. Bistable 7 outputs a signal Y when I = + 10 amperes. Bistable 8 outputs a signal B when I is positive. Bistable 9 outputs a signal C when I = + 20 amperes. Bistable 10 outputs either a signal D' for I = 20 amperes or a signal D for I between 0 and 20 amperes. Bistable 11 outputs a signal F when I = + 5 amperes.

The (R-C-type) differentiator unit 60 outputs a signal to a relay 61 when the charging current is increasing. The relay 61 has a 2-minute closure delay; if the charging current continues to rise for more than 2 minutes, the contact of relay 61 operates a warning indicator 62.

Figure 2:
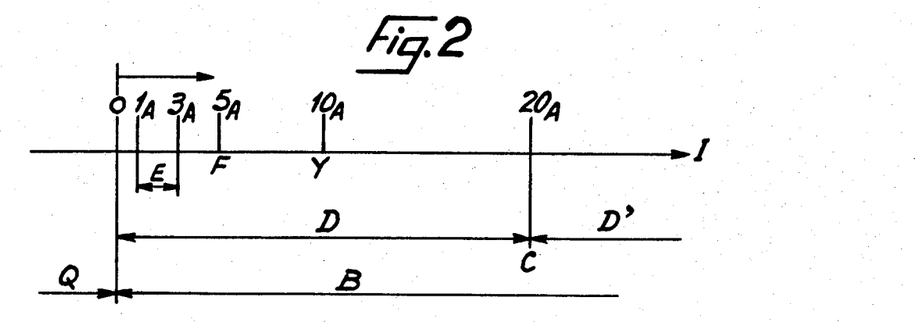
FIG. 2 is a diagram showing the current levels at which various signals used in the logic circuit arrangement are transmitted.

FIG. 2 is a schematic view of signal distribution plotted against current values I. Critical current values, namely 1, 3, 5, 10 and 20 amperes, and the corresponding signals are indicated along the current scale I from zero.

Charging time is measured by a timer 40 which the signal E starts and which gives timings of 5, 15 and 60 minutes. The timer is stopped and zero reset by the signal Q and by a signal X which, as will be described hereinafter, is given to open the contactor 3 — i.e., to stop charging. The timer 40 transmits a signal J at the time $T_1 = T'_0 + 5$ minutes, a signal H in the period of time between $T'_0$ and $T_2$, with $T_2 = T'_0 + 15$ minutes and a signal H' for the period of time between $T_2$ and $T_3$, with $T_3 = T'_0 + 60$ minutes, and a final signal $x'$ at the actual instant of time $T_3$.

Figure 3:
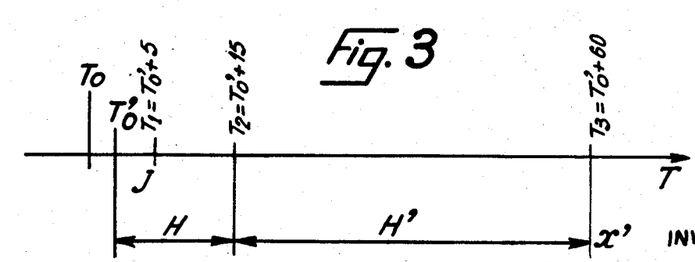
FIG. 3 is a diagram similar to FIG. 2 showing the times at which the various clock signals are transmitted.

FIG. 3 is a schematic view showing signal distribution plotted against the time T from the origin time $T_0$.

The off-load battery voltage is measured by a threshold voltage detector facility 36 which compares the off-load voltage of battery 4 with a reference voltage V — in the event, 25 volts — and which actuates bistable 37 when the off-load battery voltage decreases to below the reference voltage, bistable 37 then outputting a signal M which goes to gate 29 of the logic unit. The threshold detector 36 is operated upon receipt of the signal X.

A voltage threshold detector is also used to measure network current demands; when there is a network demand, the network voltage drops for a time. A voltage threshold detector 33 compares the network voltage of 29 volts with a reference voltage V' of 27 volts. If the network voltage is above 27 volts the detector 33 actuates a bistable 35 which outputs a signal to the gate 28 of the logic unit. If the network voltage is below 27 volts, the detector 33 operates a bistable 34 which outputs a signal to gate 31. Bistable 34 also comprises a 0.1 second delay circuit to prevent misresponses caused by transients in the network.

As previously stated, the first unit also comprises manual control and starting means which are basically a multipole selector 25 having three positions — "on", "normal", "off" — and the three positions are represented by three studs $P_1$, $P_2$, $P_3$. The "on" position $P_1$ is an emergency position for use in the event of a failure of the system or if it is required to make the system inoperative but use the battery 4. In this position of the selector 25 the contactor 3 is closed via the conductor 53 and the system shown in the diagram ceases to be energized. In the "normal" position $P_2$ switch 25 connects the power supply 26 of the system via a shunt 54 for the operating current of the battery 4. A permanent signal K is also output to gates 28, 29, 12 of the logic unit, and whenever selector 25 is moved into the position $P_2$ from either of the other positions an auxiliary timer 27 is started and for 10 seconds outputs a signal L to gate 28. In the "off" position $P_3$ the power supply 26 is cut out and in the absence of signal to the contactor 3 the same stays "off". This position corresponds to total cessation of use of the battery, system and network.

The electronic logic unit mainly comprises AND-gates and OR-gates receiving the signals from the first unit, combining such signals and routing them to obtain the two required basic signals — i.e., the contactor-closing signal Z and the contactor-opening signal X.

In normal operation the contactor 3 requires reclosing in four cases:

a. When selector 25 is turned to "normal" from either of its other two positions (for instance, after a general stoppage), a charging sequence must start.

b. When the off-load voltage drops to below 25 volts.

c. When the network voltage drops to below 27 volts (demand on the network requiring a supplementary make-up of energy from the battery).

d. When the automatic pilot 38 is used (safety measure), more particularly for landings.

A new charging sequence must also be begun after each call on the battery by the distribution network 49.

The closing circuit of contactor 3 mainly comprises AND-gates 28, 29 OR-gate 30 and a closing-signal store embodied by OR-gate 31 and AND-gate 32 and performs the various functions as follows:

In Case (a) just indicated, moving selector 25 to the "normal" position $P_2$ starts the timer 27 which outputs a signal L to gate 28 for 10 seconds. While selector 25 is in this position a continuous signal K is applied to AND-gate 28, 29, 12 and cuts in the power supply 26 so that the whole system starts up.

If the network voltage is above 27 volts, AND-gate 28 receives a continuous signal from bistable 35, actuated by threshold detector 33 supervising network voltage. Consequently, AND-gate 28, which simultaneously receives three signals, transmits, for the 10 seconds duration of the signal L, a signal to OR-gate 30 which passes such signal on to OR-gate 31. The same outputs the signal Z for closing contactor 3. The signal Z also cancels its inversion $\overline{Z}$ which, as will be seen hereinafter, was present at the input of AND-gate 24 to ensure storage of the contactor-opening signal X.

The signal Z is then stored through the agency of AND-gate 32, which sticks for as long as it does not receive the signal $\overline{N}$ produced by the open contactor 3. Conversely, the signal N produced by the contactor 3 at its closure cancels the output signal of gate 32 and the signal Z stored in the store formed by gates 31 and 32.

Once charging current has started to flow, when its value enters the 1–3 ampere range — i.e., a few seconds after closure of the contactor 3 (time $T_0$) — the bistable 5 transmits (at the time $T'_0$) a signal E for starting the timer 40 which supervises charging in a manner to be described hereinafter.

If in case (b) the battery off-load voltage drops below 25 volts, the bistable 37 transmits a signal M to AND-gate 29, which is already receiving signals K and $\overline{N}$ (contactor 3 open). AND-gate 29 transmits a signal to OR-gate 30 which passes the signal on to OR-gate which outputs the contactor-closing signal Z, the same being stored as previously.

Similarly, in case (c), if network voltage drops below 27 volts the bistable 34 directly transmits a signal to OR-gate 31 which outputs the contactor-closing signal Z which is stored as previously.

In case (d), where there is no action by the logic circuits, the contactor 3 receives via conductor 55 a closing signal from an automatic pilot 38 immediately the same is started. To this end, and as will be described in greater detail in the description of FIG. 5, the contactor system 3 comprises an auxiliary control circuit in parallel with the main circuit, the auxiliary circuit closing upon receipt of a command from the automatic pilot and opening in the absence of such signal.

Charging and the control of contactor opening are supervised by circuits comprising AND-gates 12, 13, 14, 17, 18, 19, 20, 21 and 24 and OR-gates 15, 16, 22 and 23.

After closure of contactor 3 by the signal Z from the AND-gates 28 or 29, the charging current starts to flow. The bistable 5 outputs a signal E to OR-gate 30, to confirm contactor closure, and to timer 40. Five minutes later timer 40 transmits a signal J to AND-gate 12 which is already receiving a signal K (selector 25 at "normal"). AND-gate 12 then transmits a signal G to AND-gates 13, 14 and two cases may arise:

If the charging current I is above 20 amperes, AND-gate 13 also receives a signal D' from bistable 10, in which event AND-gate 13 transmits a signal to OR-gate 15 which passes the signal on to the inputs of AND-gates 19 and 21 and causes the signal to be stored by AND-gate 17, since the same is also receiving a signal B from bistable 8 (I> 0). When the current I drops to zero or becomes negative, therefore, the store is cleared.

If the charging current is below 20 amperes, the AND-gate 14 receives as well as the signal G a signal D from the bistable 10 (I<20 amperes) and in this event transmits a signal to OR-gate 16 which stores such signal through the agency of AND-gate 18 and transmits it to AND-gate 20, since AND-gate 18 is also receiving the signal B.

In the latter case, when the current I drops to 5 amperes the bistable 11 transmits a signal F to the AND-gate 20, which opens and transmits a signal $x$ to the OR-gate 22 which stores such signal through the agency of the OR-gate 23 and AND-gate 24. As already stated, the AND-gate opens upon simultaneous reception of the signal X (for opening the contactor) and the signal Z (contactor closed).

OR-gate 23 then transmits an opening signal X to the contactor 3 and to the threshold detector 36 to bring the same into operation to check the battery off-load voltage. The signal X exists for as long as the OR-gate 31 does not output any signal Z (contactor closure). The signal X also goes to the timer 40 to stop and zero reset the same.

Also, since the charging circuit has opened, the current I drops to zero and the bistable 8 ceases to output the signal B to the AND-gates 17, 18, and so storage of the signals delivered by OR-gate 16 is cancelled. Similar considerations would apply if the signals had been stored by the OR-gate 15 and AND-gate 17.

When, as previously explained, I is above 20 amperes after 5 minutes, a signal appears at the output of gate 15 and two cases may arise:

Case 1 - I drops to 20 amperes within 15 minutes. During this time (FIG. 3) the timer 40 delivers a signal H to AND-gate 21 whose input is continuously supplied with the signal from the gate 15. When I drops to 20 amperes the bistable 9 transmits a signal C to the AND-gate 21 which, since its three inputs are receiving signals, transmits a signal to OR-gate 22 which then outputs a signal $x$ which via the OR-gate 23 outputs the opening signal X, whereafter the same procedure is initiated as previously.

Case 2 — the current I is still above 20 amperes after 15 minutes. After 15 minutes the timer 40 transmits a signal H' to AND-gate 19, to whose input the signal from OR-gate 15 is still being applied. If too $I = 10$ amperes, the bistable 7 transmits a signal Y to the AND-gate 19 which in turn transmits a signal to AND-gate 22. The cycle of opening, storing and supervising the off-load battery voltage starts as previously.

If the network makes a demand on the battery during a charging sequence so that charging is interrupted and the current I reverses, the bistable 6 transmits a signal Q to the timer 40, which stops and returns to normal. The bistable 6 transmits the same signal Q to the OR-gate 31 to confirm closure of the contactor 3. When the current I turns positive again and its value increases and enters the 1–3 ampere range, bistable 5 transmits a signal E to timer 40, so that the same restarts, and to OR-gate 30 to confirm closure of the contactor 3.

However, charging once begun cannot last in all for more than one hour, for after one hour the timer 40 outputs the signal $x'$ which goes to OR-gate 23 which outputs the signal X.

A description will now be given with reference to FIG. 5 of the contactor 3 – i.e., the electronic and electromagnetic unit or assembly or system or the like for opening and closing the battery charging and load circuit.

The signals from the gates 23, 31 are amplified by electronic power amplifiers which are disposed at the input of contactor 3 and, with advantage, combined therewith. Signal Z is amplified in an amplifier 41 which energizes a relay 43 comprising a normally open contact, and the signal X is amplified in an amplifier 42, the same energizing relay 44 which has a normally closed contact. The relays are shown in their normal states – i.e., in their positions in the absence of any signal.

The contacts of the relays 43, 44 are in series in a circuit connecting the battery to the winding of an electromagnetic contactor 46 adapted to connect the battery to and disconnect the battery from the network. In the absence of energization there is no connection and the contactor blade or arm or wiper or the like 56 closes an auxiliary circuit energizing an indicating lamp 47 disposed on the control panel near the selector 25.

The electromagnetic contactor 46 also energizes a parallel potentiometer circuit 48 which provides the signal N for the gates 29 and 32 and which also comprises a manual switch 50; the same can be placed near and possibly mechanically coupled or combined with the selector 25 so as to be open when the selector 25 is "off" or "on" and to be closed when the selector 25 is "normal".

The overriding closure signals from either the selector 25 or the automatic pilot 38 go in parallel to the winding of the relay 45 whose switch is in parallel with the contacts of the relays 43, 44. When a closure signal reaches the relay 45, the winding of the main relay 46 is energized regardless of the state of the relays 43, 44, and the battery is connected to the network 49.

When a signal Z reaches the amplifier 41, the relay 43 closes, the X-signal store is simultaneously cleared and in the absence of X signal the relay 44 closes so that the contactor 46 connects the battery to the network.

If the amplifier 42 receives a signal X, the relay 44 opens and the contactor 46 therefore drops, disconnects the battery from the network, lights the indicating lamp 47 and energizes the potentiometer circuit 48 which outputs a signal N, inter alia to gate 32, so that the Z-signal store is cleared. Upon the disappearance of the signals Z the relay 43 drops and opens.

The invention is of use for floating storage batteries used in a voltage-controlled electrical network, more particularly in the electrical systems of aircraft and devices having similar networks such as submarines, tanks, armor devices, air cushion vehicles and hydrofoils.

We claim:

1. In a method of using a buffer battery in a d.c. distribution network having a charging current source which normally covers the network current requirements and which can also charge the battery, comprising the steps of cutting the battery into the network through a contactor depending at least upon a predetermined network voltage drop below the normal battery voltage or upon a drop of the battery off-load voltage below a reference voltage, and in the event of the latter event, charging for a predetermined period of time and at the end of the predetermined period of time, comparing the actual charging current with a reference current, proceeding with the charging when the charging current is above said reference current, and stopping the charging when the charging current is below said reference current.

2. A method according to claim 1, wherein the predetermined period is short enough to ensure that the charging energy is always insufficient to reach the limited state of battery charge, and the charging current is assessed at least at the end of the first charging period and, if the current thus measured is relatively small, the first charging period is prolonged until the charging current has dropped to a first predetermined lower level, whereas if the charging current at the end of the first charging period is relatively high, a further predetermined charging time is given whereafter the current is re-assessed.

3. A method according to claim 2, wherein the current measured at the end of a charging period following the first charging period is compared with another threshold, and if the current thus measured is below such other threshold charging is stopped, but if the measured current is above such other threshold charging continues until the charging current has dropped to another lower level greater than the first level.

4. A method according to claim 3, wherein the sum of the charging periods is limited to a predetermined value.

5. A method according to claim 1, wherein the contactor is systematically closed on the network whenever the same is connected to any safety device, including an aircraft automatic pilot at landing.

6. A method according to claim 1, wherein the contactor remains closed and a predetermined time period is restarted after any voltage drop initiating contactor closure.

7. A method according to claim 1, when the charging current continues to increase during a predetermined time in a charging sequence, a warning is triggered.

8. A method according to claim 1, wherein the charging procedure begins at each cutting-in of the battery.

9. A circuit arrangement comprising
a storage battery system
a contactor connected to said battery system,
a network for charging and loading the battery connected to said contactor,
at least one OR gate connected to send a contactor-closing signal to said contactor,
a first comparator circuit for comparing the network voltage with a reference voltage connected to said OR gate,
a second comparator circuit for comparing the battery off-load voltage with a reference voltage also connected to said OR gate,
a detector of current flow connected to detect the charging current flow between the network and the battery, and
an electronic clock connected to said detector to be started by said detector and to send a contactor-closing signal to said contactor.

10. A circuit arrangement according to claim 9, wherein a circuit arrangement for comparing the load current with a current threshold actuated after a predetermined period of time by a signal from said clock, the last-mentioned circuit arrangement comprising two branches, one of which is operative if the load current is below the threshold and initiates, upon the current dropping below a first level, a signal opening said contactor, the second branch being operative if the load current is above the threshold and leaving said contactor closed for a second period determined by said electronic clock.

11. A circuit arrangement according to claim 10, wherein a comparator circuit for comparing the charging current with a threshold current level associated with said second branch of said two-branch circuit arrangement, said comparator circuit transmitting an opening signal to said contactor when the charging current drops below the threshold during the second charging period, said comparator circuit maintaining the contactor-closing signal if the current is still above the threshold at the end of the second charging period, the contactor-opening signal being transmitted when the current drops below another lower level higher than the first level.

12. A circuit arrangement according to claim 9, wherein said contactor is electromagnetic and the contacts of two relays are disposed in series in the contactor coil circuit, the first relay being a relay whose normally open contact receives the closing signal, while the second relay is a normally closed relay receiving the opening signal.

13. A circuit arrangement according to claim 12, wherein the circuit portion comprising the two relay contacts is shunted by the normally open contact of a third relay whose winding receives a permanent closure signal from the contactor.

14. A circuit arrangement according to claim 10, wherein said detector of current flow direction between said network and said battery system and the means for estimating the current level in the connection between said network and said battery system take the form of a Hall detector whose magnetic field winding is in series in such connection, the semiconductor of said detector being flowed through by a constant current.

15. A circuit arrangement according to claim 14, wherein said detector output voltage is applied in parallel to a number of bistables which have different characteristics and which change their state at predetermined values of the output voltage.

16. A circuit arrangement according to claim 14, wherein said detector output voltage is applied to a differentiating module which outputs a signal when the output voltage is increasing, the latter signal being applied to a delay relay, one of whose contacts initiates a warning when the voltage continues to rise for a predetermined time.

17. A circuit arrangement according to claim 9, which comprises a three-position operation selector having a main "supply off" position, a position giving a merely the transmission of an energizing signal for the third relay, and a normal operation position in which the entire circuit arrangement is energized and a starting signal is given.

18. A circuit arrangement according to claim 17, wherein the selector in the normal operation position also energizes a timer which outputs a signal for a short time after starting.

19. A circuit arrangement according to claim 9 wherein a first OR-gate receives the output signal of two AND-gates, the first AND-gate receiving at least the contactor starting signal and the brief timer signal, the second AND-gate receiving the starting signal, a signal output by the contactor when open and a signal from the second comparator circuit, the OR-gate output being connected to the input of a second OR-gate also receiving the signal of the first comparator circuit directly, and the contactor-closing signal is taken from the output of the second OR-gate, such output being looped to the OR-gate input by way of a third AND-gate which also receives a signal from the contactor when the same is closed, thus forming a closure-signal store.

20. A circuit arrangement according to claim 9, wherein a bistable which outputs a signal when the current flow is from the battery system to the network in the discharging direction outputs a stop and zero resetting signal to said electronic clock.

21. A circuit arrangement according to claim wherein said electronic clock is started by the signal of a bistable detecting the beginning of the flow of current in the charging direction; and such clock outputs a signal after a first charging period to one input of an AND-gate whose other input receives the starting signal, the output of the last-mentioned AND-gate being connected to the input of two other AND-gates connected one each to the two outputs of a bistable, the latter outputs being alternately operative above and below a current threshold, the output of each of the latter AND-gates being connected to the input of one of the two OR-gates of a pair, the output of such OR-gates determining the transmission of a contactor-opening signal, the outputs of each of the last-mentioned ORlgates being looped to their respective inputs each by way of another AND-gate whose input also receives the signal transmitted by a bistable when the current flow is in the charging direction.

22. A circuit arrangement according to claim 23 wherein the output signal of the OR-gate or OR-gate pair receiving from the threshold bistable the signal corresponding to a current level below the threshold goes to an output AND-gate which also receives from a bistable the signal transmitted when the current reaches a first lower level, the last-mentioned AND-gate then delivering an opening signal to the contactor, and the output signal of the other OR-gate of the OR-gate pair goes in parallel to a pair of output AND-gates, one of which also receives a signal for a second charging period from the electronic clock while the other receives a signal beyond the second charging period, the latter AND-gate pair receiving from two bistables, each adapted to output a signal when the current drops to a lower level, the one a signal for a current level at least equal to the threshold and the second a signal for a lower level, these two AND-gates each outputting a contactor-opening signal.

23. A circuit arrangement according to claim 22, wherein the signals of the three output AND-gates go to the input of at least one OR-gate whose output supplying the contactor-opening signal is looped to its input by an AND-gate also receiving the inversion of the contactor-closing signal.

24. A circuit arrangement according to claim 9, wherein said second comparator circuit is brought into operation by the contactor-closing signal, and said electronic clock is rendered inoperative and zero reset by the latter signal.

25. A circuit arrangement according to claim 12, wherein the wiper of the contactor in normal position connects to the battery system circuit a parallel arrangement comprising an indicating lamp and a potentiometer from which the closed-contactor signal is taken.

26. A circuit arrangement according to claim 25 wherein the manual selector comprises an auxiliary contact in series in the parallel circuit arrangement comprising the indicating lamp and the potentiometer.

27. A circuit arrangement according to claim 9 wherein the output of the electronic clock is connected to the input of an OR-gate whose output delievers a contactor-opening signal, such output being energized after the clock has been operating for a predetermined time after starting, the latter period being longer than the sum of the previous consecutive periods.

* * * * *